SUPERHETERODYNE MIXER CIRCUIT

Filed June 28, 1951 2 Sheets-Sheet 1

INVENTOR
Edwin Cornet
BY F.J. Harbaugh
ATTORNEY

Aug. 9, 1955 E. CORNET 2,715,179

SUPERHETERODYNE MIXER CIRCUIT

Filed June 28, 1951 2 Sheets-Sheet 2

INVENTOR
Edwin Cornet
BY
F. J. Harbaugh
ATTORNEY

United States Patent Office 2,715,179

Patented Aug. 9, 1955

2,715,179

SUPERHETERODYNE MIXER CIRCUIT

Edwin Cornet, Bellmawr, N. J., assignor to Radio Corporation of America, a corporation of Delaware Application June 28, 1951, Serial No. 234,038

7 Claims. (Cl. 250—20)

This invention relates to radio receiving circuits and more particularly to superheterodyne demodulator or mixer circuits for detecting relatively low radio frequency and relatively high radio frequency signal bands in the same receiver.

In receivers of this type it has been found that an improvement in signal-to-noise ratio occurs with the use of a triode first detector in the very high frequency channels, or frequency modulation (F. M.) band. For best results in the low radio frequency channels or amplitude modulation (A. M.) broadcast band, a pentode mixer has been found preferable because of the higher conversion gain obtainable. It has been customary to use either a pentode or a triode mixer tube and operate it on both bands in like manner on each, although some receivers have gone to the added expense of using a pentode mixer for A. M. reception and a separate triode mixer for F. M. reception. From an economic viewpoint, the use of such separate mixers for A. M. and F. M. is often impractical. These prior arrangements are less efficient either economically, if separate mixers are used, or for performance, if pentode or triode operation is used without change for both low frequency and high frequency mixer operation.

An object of the invention is to provide a lower cost demodulator or mixer for superheterodyne receivers of low and high radio frequency bands, such as A. M.-F. M. receivers, having the advantages of a pentode mixer for low radio frequency band and of a triode mixer for the high radio frequency band while using only a single mixer tube for both functions.

Another object of the invention is to provide a simple and inexpensive switching circuit for changing over from one channel in the output of a multi-electrode translating device, using with said channel one circuit combination of electrodes, to another channel using a different circuit combination of electrodes.

In accordance with the invention a screen-grid, or pentode, mixer in a superheterodyne is changed over from screen-grid operation, that operates most efficiently for a relatively low radio frequency signal band, to triode operation, functioning best for operation on a relatively high radio frequency band, by a simplified switching arrangement that simultaneously selects the desired intermediate frequency channel for the chosen band and changes over the local oscillator circuits and input circuits, correspondingly, using simply a single-pole double-throw switch for each.

Figure 1:
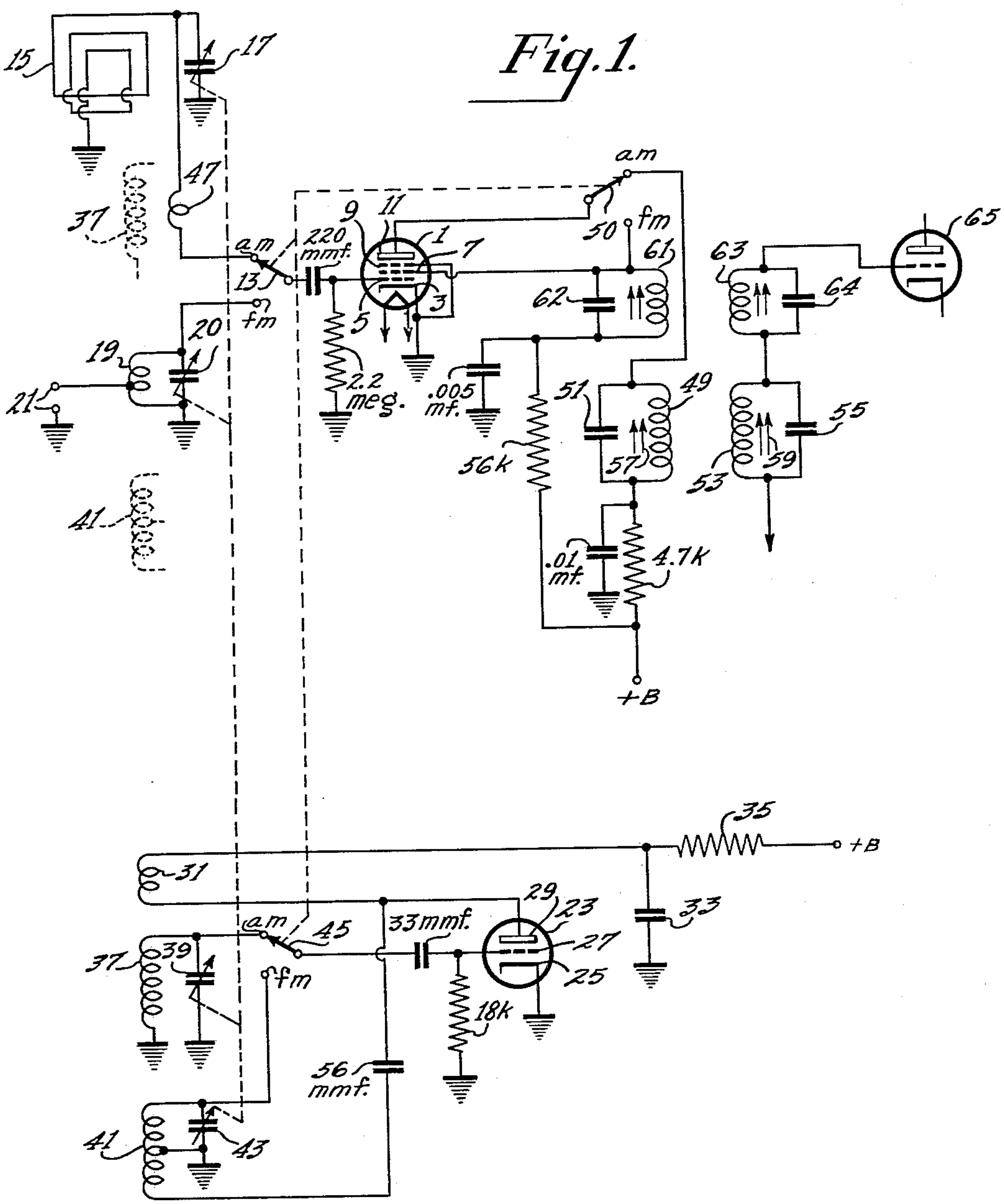
Figure 2:
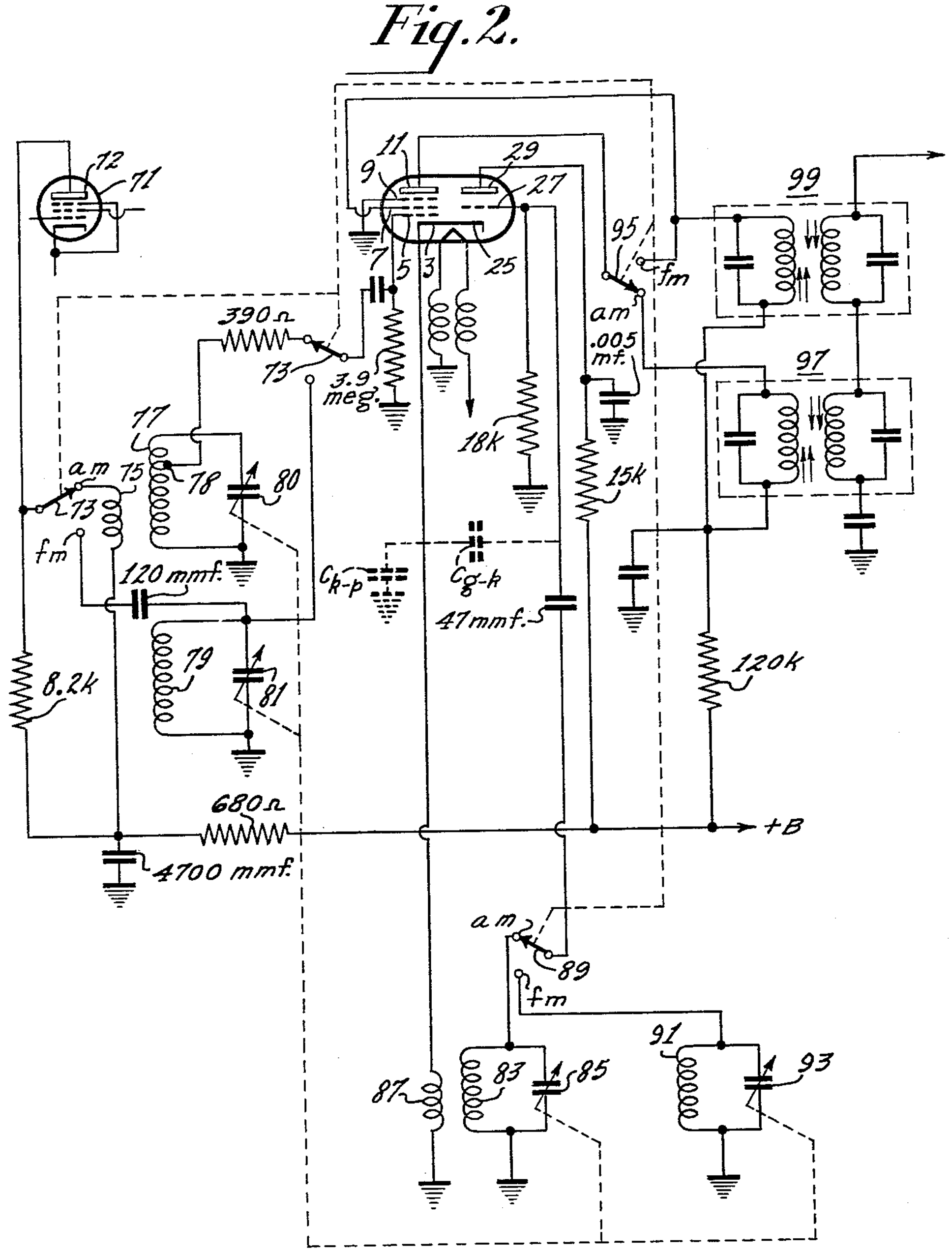

Other objects of the invention will become apparent as the description of the invention is developed with reference to the accompanying drawings in which:

Fig. 1 diagrammatically illustrates a portion of a multiband, or A. M./F. M., superheterodyne radio receiving system embodying the invention and, Fig. 2 is a diagrammatic illustration of a modified form of the invention, designed especially for production.

Referring to Fig. 1, an electronic screen grid pentode first detector mixer device or demodulator 1, having an indirectly heated cathode 3, control grid 5, screen-grid 7, suppressor grid 9 and anode 11, is arranged to be connected with a source of relatively low radio frequency signals such as the broadcast amplitude modulated (A. M.) band, (540 kc. to 1600 kc.), or a source of relatively high radio frequency signals such as the frequency modulated (F. M.) band (88–108 mc.). The control grid 5 of the mixer is shown connected through a small capacitor, of the order of 220 micro-microfarads (mmf.), and a single-pole double-throw switch 13 to a conventional loop antenna 15 that is tuned by a variable capacitor 17. The grid circuit may be connected by switch 13 to a high radio frequency input inductor 19, tuned by a variable capacitor 20, connected to input terminal 21, to which the usual dipole antenna may be connected for F. M. reception.

A local oscillator, of the Hartley type, comprises an electronic triode 23 having a cathode 25, grid 27, anode 29, a grid capacitor, and leak resistor of the order of 33 micro-microfarads (mmf.), and 18,000 ohms, respectively, a tickler feedback coil 31, source of "B" supply current and filter 33 and 35, an A. M. oscillator inductor 37, tuned by a variable capacitor 39, and an F. M. oscillator inductor 41 tuned by variable capacitor 43. The grid circuit is arranged to be connected to either inductor by means of a second single-pole double-throw switch 45, ganged with switch 13 for simultaneous operation. For A. M. operation, as shown, oscillatory energy is fed back from the anode 29 to the inductor 37 through the coil 31. When the switch is thrown to the F. M. position, oscillatory energy is fed back from the anode through a coupling capacitor of the order of 56 micro-microfarads, the tickler coil 31 of the A. M. band acting effectively as a radio frequency choke coil for the higher frequencies of the F. M. band, thereby simplifying switching and making it possible to use the type of switch shown. For A. M. operation the local oscillations are injected into the detector mixer circuit by mutual coupling between inductor 37 and a coil 47, as shown in dotted lines, in series in the A. M. signal input circuit. In the F. M. operation the oscillatory energy from the oscillator is fed into the F. M. input circuit by mutual induction between inductors 41 and 19, the coupled relation being shown by duplicating 41 in dotted lines.

The resulting intermediate frequency output of the mixer comprises a pair of I. F. transformers, the first for A. M. and a second for F. M. operation and a third single-pole double-throw switch 50, ganged with the others for selecting the corresponding I. F. channel. The A. M. transformer resonates at 455 kc. and consists of primary inductor 49, and fixed shunt capacitor 51, a secondary inductor 53 and fixed shunt capacitor 55. The inductors are tuned preferably by ferro-magnetic cores 57 and 59, as in Harvey Patent 2,283,924 May 26, 1942. The lower end of the primary 49 is connected through a filter resistor of the order of 4700 ohms to the "B" power supply for energizing the anode 11 through the switch 50, in the position shown, the mixer functioning as a pentode.

The I. F. transformer for the F. M. channel resonates at 10.7 megacycles, and is preferably also permeability tuned. Primary inductor 61, resonated with a fixed capacitor 62, is connected in series with a voltage reducing resistor 56 K (56,000 ohms) between the screen grid 7 and the "B" supply for energizing the screen grid at the desired reduced voltage. The resistor 56 K, with a .005 mf. capacitor, functions also as a filter of the usual type. When the switch 50 is thrown to the F. M. position the anode 11 is shorted directly to the screen grid 7 so that the mixer operates as a triode with the anode voltage properly reduced, for triode operation, by means of the resistor 56 K. The secondary inductor 63 in parallel with a capacitor 64, is connected in series with the secondary 53 in the grid circuit of the first I. F. amplifier tube 65.

Fig. 2 is similar basically to Fig. 1 although it includes some changes in design and additional features of novelty. The mixer circuit is preceded by an R. F. amplifier 71. The output anode electrode 72 of the amplifier is connected to what may be termed the common terminal of a single-pole double-throw switch 73, and thence shown connected to the primary winding or inductor 75 of an interstage R. F. transformer for A. M. reception. The secondary winding or inductor 77 of the A. M. transformer is connected, preferably from a tap 78 thereon, through a 390 ohm resistor to the grid electrode 5 of a pentode mixer which is combined in the same tube with a triode oscillator. The electrode arrangement is similar to that in Fig. 1, relative to respective portions 3 and 25 of a common cathode, similar reference numerals designating similar electrodes. In shunt with the primary coil 75, low impedance in this case, is a resistor 8.2 K of the order of 8,200 ohms. In the case of a high impedance primary the damping introduced by the resistor is particularly useful in smoothing out the primary resonance peak. The inductor 77 is tuned by variable capacitor 80. The lower end of the primary 75 is connected to the "B" supply through a radio frequency 680 ohm resistor 4,700 mmf. capacitor filter. For F. M. reception the switch 73 connects the output of the amplifier 71, through a 120 mmf. capacitor to a tuned circuit comprising inductor 79 and variable capacitor 81. With this connection, the resistor 8.2 K serves a more important function here to supply operating current to the anode circuit of the tube 71 as a shunt feed coupling resistor when the connection through primary coil 75 has been broken for F. M. operation. It functions with the 120 mmf. capacitor as a high radio frequency coupling network.

The value, 8,200 ohms, of the 8.2 K resistor is determined by two conflicting conditions. It is desirable that the resistance be low enough that the voltage supplied to the anode be substantially the same or slightly higher than that on the screen grid for best operation on the higher frequency or F. M. band. It is also desirable that the resistance be as high as practical so that it does not introduce excessive damping into the tuned circuit of secondary 77 when operating on the lower frequency A. M. band in order to obtain maximum gain and selectivity. The value therefore is a compromise between the two conditions.

The triode oscillator section of the tube is shown connected to the oscillator tuned circuit, comprising an inductor 83 and variable capacitor 85. A feedback inductor 87 is shown in the cathode lead to ground. The tuned circuit is connected to the oscillator grid 27 through a 47 mmf. capacitor and a grid leak resistor of the order of 18,000 ohms in shunt relation. For F. M. operation switch 89 connects the grid 27 of the triode oscillator section to a higher frequency tuned circuit, inductor 91 and capacitor 93. With this connection the feedback winding 87 becomes a choke coil for the higher frequency band, as in the case of Fig. 1, although the oscillator circuit of Fig. 2 is somewhat different in that it functions as a grounded anode Colpitts type oscillator by reason of interelectrode and distributed circuit capacities, shown in dotted lines as $C_{k-p}$, the capacity as measured between cathode and anode, and $C_{g-k}$, that between grid and cathode. The anode 29 operates at R. F. ground potential by reason of the series 15,000 ohm resistor and shunt .005 mf. bypass capacitor.

As in the case of Fig. 1, switch 95, also a single-pole double-throw, switch causes the mixer to operate as a pentode for A. M. and as a triode for F. M. As shown, the switch connects the anode 11 of the pentode section to the primary of the output I. F. transformer 97, the screen grid functioning normally as a screen grid as in the case of Fig. 1. One difference, however, is that the anode and screen grid operate at the same D. C. potential in this case while, generally as in the arrangement of Fig. 1, it is preferable to operate the anode at a higher potential than the screen grid. It was found in the case of Fig. 2 that there was excessive gain and the gain was reduced by operating the anode at a lower potential. Another reason was that a filter resistor and capacitor is saved although the output impedance is made somewhat lower. On A. M. this provides adequately high plate impedance when the gain requirements permit the use of a high capacity low impedance primary on the 455 kc. I. F. transformer.

For operation on the F. M. band the anode 11 of the mixer section is switched to the primary winding of I. F. transformer 99 and, as in the case of Fig. 1, the anode is shorted to the screen grid so that the section functions as a triode for better signal-to-noise ratio operation.

With this improved arrangement, the triode mixer connection gives substantially improved signal-to-noise operation on the F. M. band. For the A. M. broadcast band the pentode mixer operation gives higher conversion gain than could be obtained with triode operation. It also gives more selectivity since the higher plate impedance does not reduce the Q of the A. M. I. F. primary, an important consideration on the A. M. band. Whereas heretofore it has been customary to use (1) either a pentode or a triode mixer on both bands connected in the same way for each band, and some receivers have used (2) a pentode mixer for the A. M. band, and a separate triode mixer for the F. M. band, the present improved arrangement has the simplicity and economy of the prior first mentioned arrangement, the improved signal-to-noise advantage on the F. M. band of prior second mentioned arrangement, and the improved conversion gain and improved I. F. amplifier selectivity of the pentode type mixer on the A. M. band. All the advantages of both prior arrangements are obtained with a single mixer-oscillator tube and with essentially no additional circuit components other than would normally be used in arrangements (1) or (2) mentioned above.

What is claimed is:

1. In a signal receiving system an electronic device comprising a cathode, an anode, a control grid and screen grid electrodes, first and second output circuits the second of which is connected permanently to said screen grid, a source of operating potential for said anode and screen grid connected with said first and second output circuit, and switch means for connecting said anode to the first of said circuits for screen grid operation therewith or to said screen grid for triode operation with said second circuit.

2. In a multi-band radio receiver for a low radio frequency band and a relatively high radio frequency band, a radio frequency amplifier device having an input and an output electrode, a source of supply current therefore, an oscillator, a mixer device, a pair of coupling circuits between said amplifier and said mixer device tuned, respectively, to said low and high frequency bands, said high frequency coupling circuit comprising a resistor and an inductor, switch means for selectively connecting said low frequency coupling circuit between said devices and connecting said resistor across a portion of said low frequency circuit, or for selectively connecting said high frequency circuit inductor between said devices and connecting said resistor as a shunt feed coupling resistor from said source to said output electrode for supplying operating current to said amplifier device, the resistance of said resistor being sufficiently high to prevent excessive damping of said low frequency coupling circuit when the latter is operatively connected between said devices and sufficiently low to prevent excessive voltage drop in the supply circuit to said amplifier device.

3. The invention as set forth in claim 2 wherein said switch means is a single-pole double-throw switch.

4. In a multi-band radio receiver for a low radio frequency band and a relatively high radio frequency band, a radio frequency amplifier device having an output electrode, a source of supply current therefor, a mixer device, a pair of coupling circuits between said devices, one of said circuits comprising a radio frequency transformer having primary and secondary windings for said low frequency band, another of said circuits comprising capacity tuned higher frequency inductor, a single-pole double-throw switch having a terminal thereof connected permanently to said output electrode and arranged to connect said electrode either to said transformer primary or to said inductor for changing from said low band to said high band, respectively, said primary being connected to said source of power supply for supplying operating current from said source through said primary and said switch to said electrode for operation on said low frequency band, a resistor permanently connected between the terminal connected with said output electrode and said power source, said resistor being the sole path for supplying current from said source to said electrode when said switch is thrown to couple said electrode to said inductor.

5. In a signal receiving system an electronic device comprising a cathode, an anode, a control grid and screen grid electrodes, first and second output circuits the second of which is connected permanently to said screen grid, said second circuit being tuned to relatively high radio frequency signals and said first circuit being tuned to relatively low radio frequency signals, a source of operating potential for said anode and screen grid connected with said first and second output circuits, and switch means for connecting said anode to the first of said circuits for screen grid operation therewith or to said screen grid for triode operation with said second circuit.

6. In a signal receiving system an electronic device comprising a cathode, an anode, a control grid and screen grid electrodes, first and second output circuits the second of which is connected permanently to said screen grid, a source of operating potential for said anode and screen grid connected with said first and second output circuits, and single-pole double-throw switch means for connecting said anode to the first of said circuits for screen grid operation therewith or to said screen grid for triode operation with said second circuit.

7. In a signal receiving system an electronic device comprising a cathode, an anode, a control grid and screen grid electrodes, first and second output circuits the second of which is connected permanently to said screen grid, a source of operating potential for said anode and screen grid connected with said first and second output circuits, switch means for connecting said anode to the first of said circuits for screen grid operation therewith or to said screen grid for triode operation with said second circuit, and a voltage reducing resistor connecting said source of potential to said second circuit and said screen grid for normal operation as a screen grid tube with said anode connected to said first circuit and for reducing the voltage to said anode when said anode is connected to said screen grid and said second circuit for triode operation.

References Cited in the file of this patent

UNITED STATES PATENTS

| | | |
|---|---|---|
| 1,745,369 | Holden | Feb. 4, 1930 |
| 2,148,633 | MacDonald | Feb. 28, 1939 |
| 2,516,272 | Thompson | July 25, 1950 |
| 2,580,051 | Torre et al. | Dec. 25, 1951 |

FOREIGN PATENTS

| | | |
|---|---|---|
| 525,968 | Great Britain | Sept. 9, 1940 |

OTHER REFERENCES

RCA Receiving Tube Manual, 1937 edition, pages 145 to 147.

Radio Engineers Handbook, F. E. Terman, 1943 edition, page 317.